United States Patent

[11] 3,595,561

[72] Inventor Charles Modeste Leblant
　　　　　　Arque la Bataille, France
[21] Appl. No 816,317
[22] Filed Apr. 15, 1969
[45] Patented July 27, 1971
[73] Assignee La Cellophane, Societe Anonyme
　　　　　　Paris, France
[32] Priority Apr. 19, 1968
[33] France
[31] 148595

[54] METHOD OF AND MEANS FOR ENSURING ACCURATE REGISTRY AT HIGH SPEED OF AN ORIGINAL AND A COPY SHEET
6 Claims, 3 Drawing Figs.

[52] U.S. Cl. .................................................. 271/9,
　　　　　　　　　　　　　　　　　　　　　　　　355/97
[51] Int. Cl. ........................................ B65h 3/44,
　　　　　　　　　　　　　　　　　　　　　　B65h 5/26
[50] Field of Search ......................................... 271/9;
　　　　　　　　　355/97, 100, 103, 108; 101/451

[56] References Cited
UNITED STATES PATENTS
2,883,929　4/1959　Eichenbaum ................. 271/9 X
3,364,857　1/1968　Lein ........................... 101/451

*Primary Examiner*—Edward A. Sroka
*Attorney*—Sherman and Shalloway

ABSTRACT: The present invention includes a method of and means for ensuring the accurate registry of an original and copy sheet upon their introduction into a copying machine. The copy sheet is first fed to a starting position by drive means and at the starting position the copy sheet actuates a microswitch. Actuation of this first microswitch disengages the drive means for the copy sheet and engages drive means for an original sheet. The original sheet is driven to a ready position where its driving force is disengaged upon the actuation of a second microswitch at the ready position. After a short time delay, the second microswitch permits engagement of a third driving means completely separate from the first and second driving means associated with the copy and original, the third driving means feeding the original and copy sheet in strict super imposition to the receiving portion of the copy machine.

PATENTED JUL27 1971

INVENTOR

CHARLES MODESTE LEBLANT

BY Sherman & Shalloway

ATTORNEYS

METHOD OF AND MEANS FOR ENSURING ACCURATE REGISTRY AT HIGH SPEED OF AN ORIGINAL AND A COPY SHEET

The present invention relates to an improved method of and means for ensuring the simultaneous supply of an original and a copy sheet in a document copying machine.

The method forming the subject of the invention is suitable for copying machines of all types, such as photographic, heliophotographic, electrophotographic or other machines. It can also be applied to all machines with two separate elements which have to coincide as regularly and accurately as possible, and one or the other of these elements can be continuous or discontinuous.

In known prior art supplying arrangements, the means which cause the simultaneous supply of an original and a copy sheet are initiated by the supply of the original. According to the known methods, the original, driven between two rollers at the sometimes high speed which is chosen for effecting the copying, releases during its travel a member which delivers a copy sheet, or cuts a copy sheet of appropriate length from a supply supported on a spool or drum. The copy sheet is superimposed on the original at the instant when it is positioned in front of the operative members of the copying machine. This operation is generally effected by the action of a microswitch or a clutch arrangement or by any other known engaging means.

Such a system involves a certain number of disadvantages, the culmination of which is a displacement of the original relative to the copy sheet. In these systems, the microswitches suddenly release the means which bring the copy sheet towards its operating position, resulting in a delay of a few fractions of a second in the delivery of the copy sheet since the inertia of the driving mechanism must be overcome. It is true that it is possible to overcome this delay by providing a time difference between the driving of the original and that of the copying sheet. However, as this time difference must necessarily be constant and since the delay depends on the operation of the microswitch, the time difference cannot compensate for the variable speeds at which the originals are driven. In addition, it is impossible to compensate for the fatigue experienced by the microswitch, the operation of which causes the supply and sudden switching off of the electric current to the copy sheet supplying means and can be accompanied by arcing which results in early deterioration of the microswitch contacts.

Apart from the unreliability of the microswitches, it is also necessary to bear in mind other elements which vary according to the operating speed and degree of wear, including the response time of the relays, the response time of the brakes, etc.

As is apparent, all these deficiencies have the effect of producing a shift between the original and the copy sheet. This is increased with the operating speed of the machine and frequently the shift far exceeds a millimeter, which is generally considered as being maximum acceptable limit. At a working speed of 600 meters per hour, which is usual for such machines, a shift of 1 millimeter corresponds to an inaccuracy of response time in the order of five-thousandths of a second.

In prior art systems employing a stack of copy sheets of predetermined size arranged for supply to the copy machine in superimposed relation to the original, it becomes quite important that the leading edge of the copy sheet and the original coincide since it is usually desirable to have the matter reproduced on the face of the copy sheet in the same relation to the face of the copy sheet as was shown on the original. Further, when the original is completely full of matter to be copied and the copy sheet is the same size as the original, a shift in the position of the copy sheet and the original will result in an inaccurate or incomplete copy.

Briefly, the method which forms the subject of the present invention consists of initially positioning a copy sheet in a "ready" station, positioning the original in an established "starting" station, where its presence, after a short delay, initiates the simultaneous supply at the selected copy speed of the original and the copy sheet.

The invention is also concerned with means for carrying out the above method and the combination of such means with machines requiring the feeding of two sheets without any slip or shifting between the two sheets.

In accordance with the present invention, the copy sheet is initially driven to the "starting" station by an auxiliary motor through the engagement of a clutch associated with the drive means for sheet driving rolls. When the copy sheet reaches the "starting" station, it actuates a microswitch, which disengages the clutch for the driving rolls of the copy sheet. Actuation of this microswitch also operates to engage a second clutch in the power output of the auxiliary motor to drive the feed rolls forwarding the original to the "ready" station. When the original reaches the "ready" station, it actuates a second microswitch which disengages the second clutch and actuates an electromagnetic brake to secure the original and copy sheet in the respective "starting" and "ready" stations. After a short time delay, a clutch between the drive mechanism for the feed of the copy machine and the rollers driving the original and copy sheet is engaged to thereby cause a simultaneous feeding of the original and copy sheet in strict superimposed relation to the feed mechanism of the copy machine. As is apparent, the "starting" station and "ready" station must be strictly positioned and equidistant from the inlet to the copy machine in order to assure that the leading edges of the copy sheet and original coincide as the sheets pass through the copying machine and strict superimposition of the sheets is attained.

While the introduction of the copy sheet and the original can be caused by means of a power transmission system between the rollers driving these sheets and the general driving motor of the copying system, this generally variable speed driving arrangement is required to rotate at a considerable speed sometimes and it is frequently preferable and more economical to ensure the introduction of the original and the copy sheet by means of a separate motor at constant and reduced speed. This provision of a separate motor for driving the copy sheet and original to the "starting" and "ready" positions insures the positioning of the sheets under identical conditions and with increased accuracy.

According to the device, the introduction of the original and copy sheet can be effected, for example, by passing them between separate pairs of rollers which are positively driven by an auxiliary motor with clutch devices of a known type interposed between the motor and the separate sets of rollers. The operation of the clutches is in response to the actuation of the microswitches previously described.

It is possible for the rollers to be controlled by a double-clutch system, either at reduced speed by the constant speed auxiliary motor referred to above, or at the speed selected for the copying by the general driving motor of the machine. These motors can also be provided with an electromagnetic brake, the operation of which is caused or suspended by the action of the same microswitches.

The proper operation of the arrangement according to the present invention is particularly dependent upon the action of the microswitches. These must be operated reliably and in a foolproof manner under the influence of a very light action, caused by the passage of a sheet of paper, which may be extremely thin, so as to avoid any sparking, but it must be capable of instantaneously causing a considerable power transfer.

Microswitches which have all these qualities and respond particularly well to the requirements which are imposed thereon within the scope of the present invention form the subject of U.S. Pat. application Ser. No. 815,355, which has been assigned to the assignee of this invention.

This state of the prior art in mind, the present invention has for its primary object a method of simultaneously supplying an original and a copy sheet to a copying machine.

A further object of the invention is a method for supplying an original and a copy sheet to a copying machine without producing any shift between the original and copy sheet.

It is another object of the present invention to provide a method for feeding a copy sheet and an original to a copying machine at the same speed during the entire feeding operation.

It is yet another object of this invention to feed an original and a copy sheet to a copying machine without any shift between the original and copy sheet, regardless of the speed at which the original and copy sheet are fed.

It is yet another object of this invention to provide means for feeding a copy sheet and an original to a copying machine simultaneously.

Yet another object of the invention is to provide means for controlling the feed of an original and a copy sheet to a copying machine, without producing any shift between the original and the copy sheet throughout the feeding operation.

It is a more specific object of this invention to provide a feeding arrangement for copying machines including an independent positioning means whereby a copy sheet is initially placed in a feeding position, means for positioning an original in a feeding position, independent of the positioning of the copy sheet, and thereafter synchronizing the feed of the copying machine, the means for feeding the copy sheet and the means for feeding the original whereby the copy sheet and the original are fed to the copying machine at the same speed, without any shift occurring between the original and the copy sheet.

The invention will be best understood by considering the following detailed description of the preferred embodiment, which is illustrative only and not intended to limit the scope of the invention as defined in the appended claims.

The description is made in conjunction with the accompanying drawings wherein.

In this constructional example, the means according to the invention forms part of a diazocopying machine for the duplication of office documents, of which only the supply member 1 is shown diagrammatically. Such machines frequently operate at high speeds, which can, for example, exceed 1,000 meters per hour. It is also necessary for them to be able to operate at very reduced speeds, if the nature of the diazopaper and that of the original make this essential. The arrangement is fitted into the front lower part of the machine, which itself is not shown.

Figure 1:
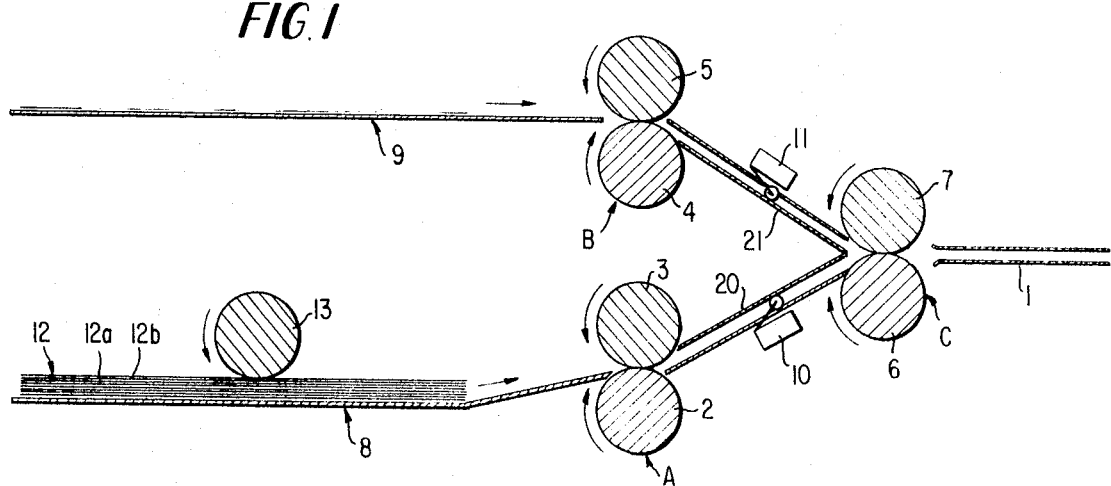
FIG. 1 is a schematic illustration of the novel apparatus and used in performing the method disclosed herein.

Referring now to FIG. 1, three sets of rolls generally indicated A, B, and C are provided. These rollers are provided to drive the copy sheet and original to the copying machine with the pair of rollers A feeding the copy sheet, the pair of rollers B feeding the original, and the pair of rollers C being the feed rollers of the main copying machine which drives the superimposed original and copy sheet in strict coincidence to the copying machine A table 9, which may be provided with guide members 15 and 16, (see FIG. 2), is provided to facilitate the introduction of the originals, either manually or by any known automatic feeding device between the positively driven supply rollers 4 and 5.

The copy sheets are indicated generally at 12 and include sheets 12a, 12b, etc., and are stacked below the table 9 on the table indicated at 8.

In operation, the copy sheet 12a situated at the top of the stack 12 is driven by a roller 13 towards the positively driven feed rollers 2 and 3 immediately upon actuation of the entire system. These rolls 2 and 3 carry the copy sheet over chute 20 toward a microswitch 10 where the sheet material passing between the chute and microswitch actuate the microswitch to disengage the driving force for the rollers 2 and 3. When the copy sheet actuates microswitch 10 to stop the driving of rolls 2 and 3, the copy sheet is then considered in a "ready" position. As an additional response to the microswitch 10, the driving force for rolls 4 and 5 is engaged thereby permitting feeding of the original over chute 21 into contact with the microswitch 11 and when the original actuates the microswitch 11, the driving force to rolls 4 and 5 is disengaged. The original is considered in the starting station when it stops in response to actuation of microswitch 11 After a short delay, a separate driving mechanism then drives rollers A, B and C in synchronization to assure that the original and copy sheet pass to the roller C and the copying machine in strict superimposition and coincidence. This strict imposition is assured by properly spacing microswitches 10 and 11 equidistance from the point of contact between rollers 6 and 7 of the feed mechanism of the copy machine.

Figure 2:
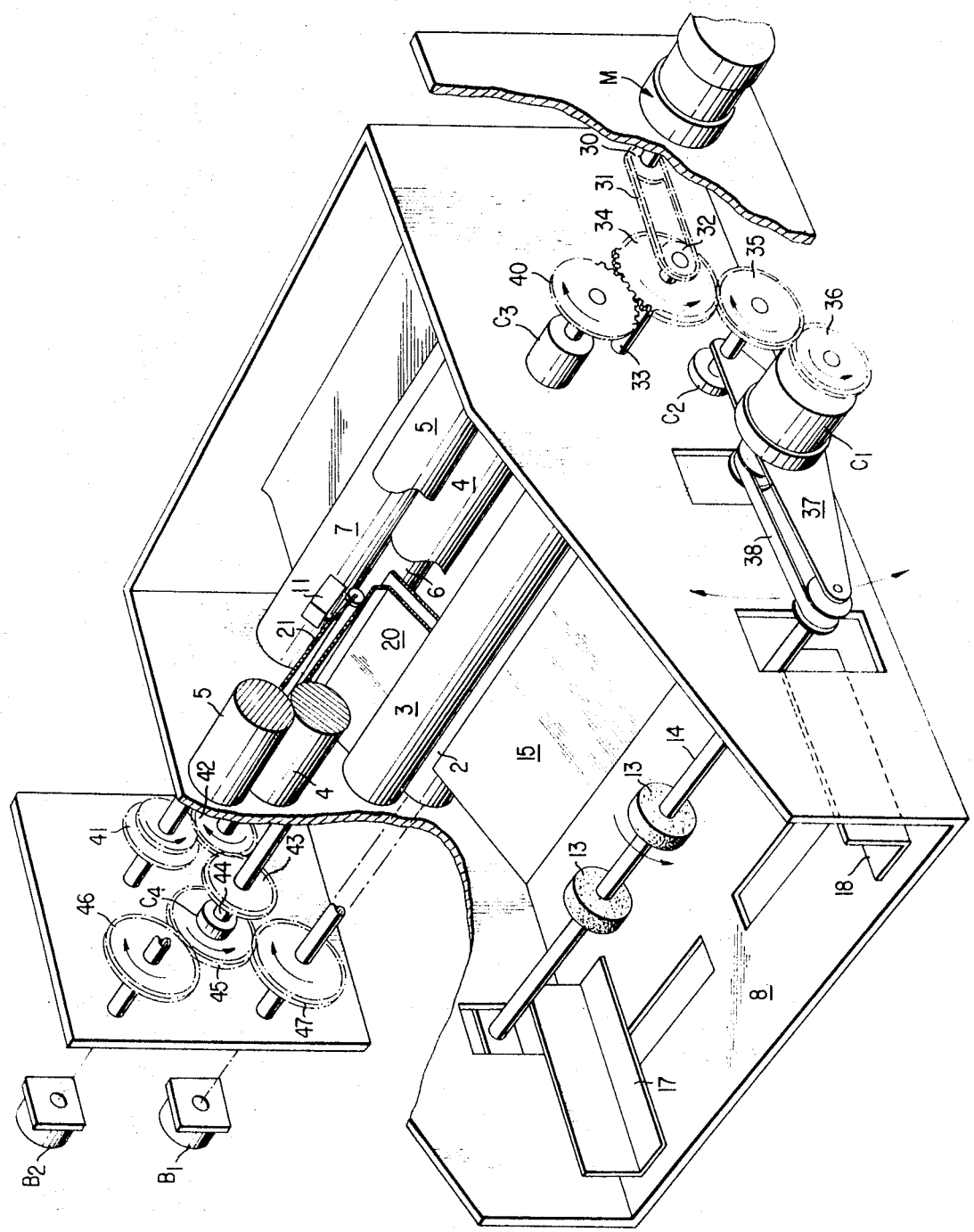
FIG. 2 is a detailed illustration in perspective of the preferred embodiment.

Referring now to FIG. 2, a detailed description of the gearing and clutching arrangement will be described. This description should also be taken in conjunction with the schematic wiring diagram shown in FIG. 3 which controls the different switching functions of the machine. When the main power switch of the feed system is thrown, power is supplied to the motor M and controls must be set for the particular type of feeding operation desired. If a number of copies of the same original is required, the system is placed on automatic feed with the indicator set at the number of copies required. If only one copy is needed, the system is set for normal operation. Motor M operates to drive the pinion 30 which through gear chain 31 drives pinion 32. Shaft 33 connected to pinion 32 drives the gear 34. Gear 34 is arranged to provide a dual output and includes a first related pinion 35 which operates to drive the pair of cylinders A for the copy sheet as well as the infeed rollers 13 for the copy sheet. The pinion 35 drives pinion 36 which through clutch $C_1$ can engage the infeed rollers 13 to supply a copy sheet to the pair of cylinders A. Microswitches 10 and 11 start in the normally closed position shown in FIG. 3, the switch 70 is in the position shown in FIG. 3 so that power is supplied to the clutch $C_1$ and the bracket 37 is forced in the counterclockwise position indicated by the arrow in FIG. 2 to cause the roller 13 to engage the top sheet 12a of the stack of copy sheets and feed same to the rollers 2 and 3. The rollers 13 are constantly driven when clutch $C_1$ is engaged through the belt 38.

Pinion 35 also operates through clutch $C_2$ to drive the rollers 2 and 3. Again, when microswitch 10 is in the closed position shown in FIG. 3, power is supplied to clutch $C_2$ through the microswitch 70 to engage the clutch and drive the rollers 2 and 3. When the copy sheet passes through rollers 2 and 3 and in interjected between the tray 20 and the microswitch 10 to actuate the microswitch 10, the relay 70 is thrown through the transistor amplifier 10a to effect the following operations. Contacts $70_1$ of relay 70 are closed to supply power to the clutch $C_3$ and start the driving of rollers 4 and 5 When contacts $70_2$ are thrown, the clutches $C_1$ and $C_2$ are disengaged to stop the driving of the infeed rollers 13 and the pair of cylinders A. Contacts $70_2$ also operate to supply power to brake $B_1$ which brakes the rollers 2 and 3 and assures that the copy sheet is placed in a proper position and is securely held in the "ready" station.

When contacts $70_1$ are thrown and power is supplied to the clutch $C_3$, the rollers 4 and 5 are driven. The driving of rollers 4 and 5 is effected from the second power output of pinion 34 which operates through pinion 40 to drive these rollers An original supplied between the rollers 4 and 5 is passed over the tray 21 until it reaches the microswitch 11 and actuates the same.

When microswitch 11 is actuated, it operates through transistor amplifier 11a to throw the relay 80. Contacts $80_1$ of relay 80 operate to disengage the clutch $C_3$ so that the driving force to the rollers 4 and 5 is stopped. Further, contacts $80_2$ operate to supply power to the brake $B_2$ associated with the rollers 4 and 5 and assure that the original is exactly positioned in the "start" position.

Contacts $80_3$ operate through the time delay relay 90 to supply power to the clutch $C_4$ as well as disengage the brakes $B_1$ and $B_2$. The time delay relay 90 provides a short delay of approximately one tenth of a second during which the original and copy sheet are stationary before the driving force to the rollers or pairs of cylinders A, B, and C is actuated. The pair of rollers C are driven through the pinion 41 which operates through pinion 42 to drive pinion 43. The pinion 43 operates to drive shaft 44 connected to the pinion 45 through the clutch $C_4$.

When clutch $C_4$ is engaged in the manner described above, the pinion 45 is driven to provide a dual output. The dual output of pinion 45 operates through pinion 47 to first drive the pair of rollers A and secondly it operates through the pinion 46 to drive the pair of rollers B. Thus, the pairs of rollers A, B, and C are all driven in perfect synchronism to assure a strict superimposition of the original and copy sheet as it is fed into the copying machine.

Figure 3:
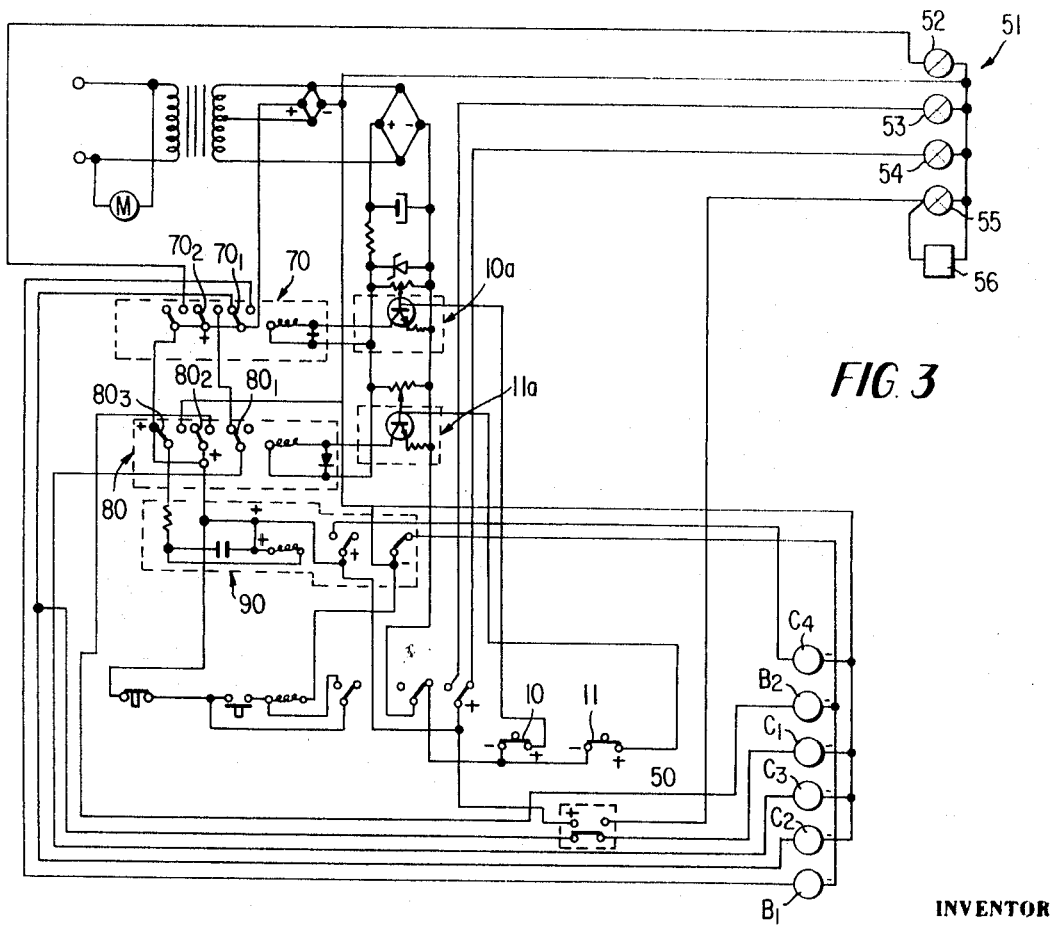
FIG. 3 is a schematic diagram of a wiring system capable of controlling the mechanism shown in FIG. 2.

As the trailing ends of the original and copy sheets pass under the microswitches 10 and 11, these switches assume the original or normally closed positions shown in FIG. 3 and, thus, the machine can be recycled. The closing of the microswitches 10 and 11 causes the time delay relay 90 to assume the original position shown in FIG. 3 so that the feeding of the original and copy sheet can be continued by the pair of cylinders C while the pair of cylinders A and B are disengaged from the power supply through pinion 41 so that the feeding of a new copy sheet by rollers 13 and the pair of rollers A as discussed at the beginning of the feeding cycle, may begin.

Indicated generally at 51 is a panel of lights which show the different operating phases of the machine. Provisions are made through contacts 50 for indicating when the supply of copy sheets from stack 12 is exhausted and similarly, the light 55 gives notice of such a condition. The system may also be provided with an alarm such as indicated at 56 to assure that the exhausted supply is called to attention. The lights 53 and 54 indicate whether the system is set to run automatically or for a single copy operation and the light 52 indicates the number of reproductions requested in an automatic operation.

The arrangement according to the invention operates in the following manner:

With the microswitch 10 and 11 in the operating position, the pair of cylinders A are driven by the constant-speed auxiliary motor M, which also drives the roller system 13. This causes the sheet 12A situated on the top of the stack 12 to pass between the cylinders 2 and 3, which feed it up to the microswitch 10. The sheet operates switch 10 and this causes the declutching of the cylinders A and the intervention of the brake at the end of the cylinder A. The pair of cylinders B are at this point clutched to the motor M to be positively driven.

With a copying sheet in position, and an original introduced between the cylinders 4 and 5, the original is fed as far as the microswitch 11 which it operates, this resulting in the declutching of the pair of cylinders B and also the intervention of the brake at the end of the pair of cylinders B and holds the original in this position. Microswitch 11 additionally controls a delay action relay, the delay time of which is a few tenths of a second. This delay action relay acts on the one hand on the brakes at the end of the pair of cylinders A and B, which it frees; on the other hand, it actuates the clutch $C_4$, which ensures the driving of the pair of cylinders A and B in synchronism with the feed rollers 6 and 7 of the copy machine.

The microswitch 11 can in addition be adjusted in position by means of a micrometer screw, so as to adjust the positioning of the copying sheet in the case where, for example, its dimension would be different from that of the original.

It is seen that the original and the copying sheet brought to the initial position perpendicularly of the microswitches 10 and 11 at constant and relatively slow speed, and, thus, with high precision, are driven and directed towards the cylinders 6 and 7 in a simultaneous and perfectly synchronized manner, which ensures their strict superimposition when they are introduced into the actual copying machine.

When the rear edge of the original and that of the copying sheet pass opposite the microswitches 10 and 11 these latter reassume their initial position and the cycle recommences.

It is quite evident that the arrangement as described can be used in copying machines of any type, as well as the diazocopying machines, and also that it can also form part of the equipment of machines other than copying machines.

In places of the copying sheet magazine, it would also be possible for example to use a spooled material comprising aligned notches or perforations spaced in accordance with a certain program, the passage of one perforation or one notch perpendicularly of the microswitch 10 causing the operation of the appropriate relays.

A preferred embodiment of the invention having been described by way of an example only, the scope of the invention should not be limited beyond the terms of the appended claims.

What I claim is:

1. Apparatus for feeding an original and a copy sheet simultaneously to a copy machine including:
   a. first means for feeding a copy sheet;
   b. second means for feeding an original;
   c. a first drive means connected to each said feeding means and selectively disengageable therefrom;
   d. a microswitch interposed in the line of feed and actuated by the passage of said copy sheet and control circuitry, responsive to actuation of said microswitch, automatically operable to disengage the drive means from said copy sheet feed means;
   e. a second microswitch interposed in the line of feed and actuated by the passage of said original and control circuitry responsive to actuation of said microswitch operable to disengage the drive means from said original feed means;
   f. second drive means operable to drive the first and second feed means in synchronism with a feed mechanism of a copy machine; and
   g. time delay means to momentarily delay operation of said second drive means after the disengagement of said first drive means from said original feed means.

2. The apparatus as defined in claim 1 wherein the first drive means includes an auxiliary constant speed drive motor.

3. The apparatus as defined in claim 1 wherein first and second brake means provide for the driving means of said original and copy sheet and said brakes are engaged respectively upon the disengagement of the first drive from the copy sheet feed means and the original feed means.

4. The apparatus as defined in claim 1 wherein the first and second microswitches are positioned an equal distance from the feed rollers of a copy machine.

5. The apparatus as defined in claim 1 wherein the second drive means is the driving means for the feed rolls of a copy machine.

6. The method of feeding an original and a copy sheet simultaneously to a copying machine, the improvement comprising: passing the copy sheet to a ready station, introducing an original into the machine, passing the original to a predetermined start position, said ready station and said start position being equally spaced from a feed point of the copy machine, detecting the arrival of the original at the start position, braking the original for a predetermined period of time at the start position in response to the detection of the arrival of the original at the start position, and engaging a clutch to drive the original and the copy sheet in strict coincidence at a predetermined required copying speed to the feed point of the copying machine in response to the detection of the arrival of the original at the start position and after elapse of said predetermined period of time.